United States Patent
Neubrand (10) Patent No.: US 6,464,284 B2
(45) Date of Patent: Oct. 15, 2002

(54) COMPACT TOP STACK LINKAGE

(75) Inventor: Frank G. Neubrand, West Bloomfield, MI (US)

(73) Assignee: CTS Fahrzeug Dachsysteme GmbH, Rochester Hills, MI (US)

( * ) Notice: Subject to any disclaimer, the term of this patent is extended or adjusted under 35 U.S.C. 154(b) by 0 days.

(21) Appl. No.: 09/952,335

(22) Filed: Sep. 13, 2001

(65) Prior Publication Data

US 2002/0084673 A1 Jul. 4, 2002

Related U.S. Application Data (60) Provisional application No. 60/232,507, filed on Sep. 13, 2000.

(51) Int. Cl.⁷ .............................. B60J 10/10
(52) U.S. Cl. ..................... 296/107.01; 296/107.07; 296/108; 296/107.08
(58) Field of Search ................. 296/107.01, 107.08, 296/108, 107.07, 107.09, 122, 116

(56) References Cited

U.S. PATENT DOCUMENTS

| | | | |
|---|---|---|---|
| 4,573,732 A | * 3/1986 | Muscat | 296/108 |
| 4,712,825 A | 12/1987 | Braga et al. | |
| 4,720,133 A | * 1/1988 | Alexander et al. | 296/116 |
| 4,741,571 A | 5/1988 | Godette | 296/107.07 |
| 4,828,317 A | * 5/1989 | Muscat | 296/107.07 |
| 4,840,421 A | 6/1989 | Hennessy | |
| 4,852,935 A | * 8/1989 | Varner | 296/107.07 |
| 4,929,015 A | 5/1990 | Bauer | |
| 4,958,882 A | 9/1990 | Kolb | |
| 5,026,110 A | 6/1991 | Koop et al. | |
| RE34,033 E | 8/1992 | Godette | |
| 5,207,474 A | * 5/1993 | Licher et al. | 296/107.15 |
| 5,251,952 A | * 10/1993 | Guckel et al. | 296/107.09 |
| 5,267,769 A | 12/1993 | Bonne et al. | |
| 5,335,959 A | * 8/1994 | Schrader et al. | 296/108 |
| 5,385,381 A | 1/1995 | Moore et al. | |
| 5,490,709 A | * 2/1996 | Rahn | 296/108 |
| 5,620,226 A | * 4/1997 | Sautter, Jr. | 296/107.08 |
| 5,667,269 A | 9/1997 | Prenger et al. | |
| 5,772,274 A | 6/1998 | Tokarz | |
| 5,816,644 A | * 10/1998 | Rothe et al. | 296/107.18 |
| 5,829,821 A | * 11/1998 | Aydt et al. | 296/107.08 |
| 5,848,819 A | 12/1998 | Sautter, Jr. | |
| 5,903,119 A | * 5/1999 | Laurain et al. | 296/107.09 |
| 5,971,470 A | * 10/1999 | May et al. | 296/107.09 |
| 5,988,729 A | 11/1999 | Klein | |
| 5,998,948 A | * 12/1999 | Lange et al. | 296/122 |
| 6,048,021 A | * 4/2000 | Sautter, Jr. | 296/107.08 |
| 6,209,945 B1 | * 4/2001 | Aydt et al. | 296/107.15 |
| 6,217,104 B1 | * 4/2001 | Neubrand | 296/107.08 |
| 6,270,143 B1 | * 8/2001 | Heselhaus et al. | 296/107.01 |
| 6,283,532 B1 | * 9/2001 | Neubrand | 296/107.07 |
| 6,390,531 B1 | * 5/2002 | Schutt | 296/107.13 |
| 6,390,532 B1 | * 5/2002 | Mac Farland | 296/108 |
| 2001/0006297 A1 | * 7/2001 | Dintner et al. | 296/108 |
| 2001/0019213 A1 | * 9/2001 | Eberle | 296/108 |
| 2001/0024050 A1 | * 9/2001 | Schutt et al. | 296/107.08 |
| 2002/0030381 A1 | * 3/2002 | Schutt et al. | 296/107.08 |

* cited by examiner

*Primary Examiner*—Kiran Patel
(74) *Attorney, Agent, or Firm*—Brooks & Kushman P.C.

(57) ABSTRACT

A convertible top for a vehicle includes right and left linkages for extension and retraction, a plurality of transverse bows and a cover supported by the bows and the right and left linkages. Each linkage includes a rear four bar linkage mounted to the vehicle and connected to a center rail, and a forward four bar linkage supporting a front rail and connected to the center rail. A pushing link interconnects the rear and forward linkages so that the front rail is inverted to a position adjacent the center rail, and the center rail is shifted rearward as the rear four bar linkage contracts. The pushing link is disposed so that it does not exceed the height of the center rail.

24 Claims, 11 Drawing Sheets

COMPACT TOP STACK LINKAGE

CROSS-REFERENCE TO RELATED APPLICATIONS

This application claims the benefit of U.S. provisional application Serial No. 60/232,507, filed Sep. 13, 2000.

TECHNICAL FIELD

The present invention relates to a top stack linkage for a convertible top.

BACKGROUND ART

Convertible tops are supported by and moved by a top stack linkage. The top stack linkage includes a plurality of bows that are joined on opposite lateral sides by a linkage that is extended in its full up position and folded back onto itself in the full down position.

Prior art top stack linkages include a rear rail assembly that is connected to a scissor link mechanism that spans the second bow and interconnects a center rail to a front rail above the second bow. The scissor link mechanism causes the front rail to pivot over the center rail. The scissor link is pulled by a pulling link connected between a point on the scissor link located above the center rail and the rear rail assembly. In prior art top stack arrangements, the pivot on the rear rail assembly is the highest point over which the front rail and number one bow are folded. This arrangement increases the height of the top stack in its retracted position and also increases the height of the roof in the extended position of the convertible top.

Styling and space requirements are adversely impacted by the vertical spacing required to accommodate the pull link.

These and other problems associated with prior art top stack linkages are addressed by the present invention as summarized below.

DISCLOSURE OF INVENTION

According to the present invention, a compact, low profile top stack for a convertible top is provided. A lower profile is possible in accordance with the invention in both the full up and full down positions of the convertible top.

According to the present invention, a push link is connected to the rear rail assembly and to a lower extension of a scissor link that bridges the center rail and front rail at the number two bow. As the convertible top moves from its extended position toward its retracted position, the push link is pushed by the rear rail assembly to cause the scissor link extension to move forward. The forward movement of the scissor link extension causes the scissor link to lift the number one bow and the front rail and move rearwardly over the center rail. The lower scissor link extension and reduced height of the rear rail assembly results in a lower profile for the convertible top in both the full up position and in the full down position.

An aspect of the invention provides a left and right linkage for extending and retracting the convertible top. Each linkage includes a rear four bar linkage interconnected to the vehicle and a forward four bar linkage supporting the front rail. The front rail is adapted to be secured to the windshield of the vehicle. A push link connects the front and rear linkages for simultaneous motion, causing the forward linkage to invert the front rail as the rear linkage contracts, thus retracting the convertible top.

Another aspect of the invention is to provide compact linkages wherein the push link shifts forward, with respect to the center rail, pushing the forward linkage and inverting the front rail as the convertible top retracts. The push link, in turn, shifts towards the rear when the convertible top is extending.

Under the invention, a pushing four bar linkage interconnects the rear and forward linkages. The pushing linkage can take the shape of a parallelogram. The push link and portions of links of both the rear and forward linkages define the pushing linkage.

These and other advantages and objects of the invention will be better understood in view of the attached drawings and following detailed description of the invention.

BEST MODE FOR CARRYING OUT THE INVENTION

Referring now to FIGS. 1–6, a convertible top stack linkage is illustrated that includes a number one bow 10 that is adapted to be secured to the windshield header of a vehicle. The number one bow 10 includes a rearwardly extending front rail 12 and a front rail seal carrier 14. The number one bow 10, front rail 12, and front rail seal carrier 14 may be formed as a one-piece casting. Numbering of the bows as referred to herein proceeds from front to rear with the number one bow being the front bow.

The number two bow 16 is indirectly connected to a center rail 18. A center rail seal carrier 20 is positioned laterally adjacent the center rail 18 for movement with the center rail 18. A number two bow control link 22 and number one bow control link 24 may be generally referred to as a scissor link. A number three bow 28 is connected to a rear rail assembly 30. A rear rail seal carrier 32 is connected to the rear rail assembly 30.

Rear rail assembly 30 is made up of a front leg 34 and a main leg 36. A balance link 38 is connected to the number four bow 40. A number five bow 42 is connected to the rear rail assembly and is adapted to be positioned flush with the belt line of the vehicle at the rear edge of the roof. A back lite 44 is normally carried by the convertible top fabric between the number four and number five bows. The top stack linkage is connected to the vehicle by a main pivot bracket 46. The rear rail assembly 30 is connected to the main pivot bracket 46. The main pivot bracket 46 includes a main pivot arm 48 extending rearwardly from the main pivot bracket 46. The main pivot bracket 46 may be fixed to a side of the vehicle, or may be formed as part of the vehicle. The balance link 38 is connected to the rear portion of the main pivot arm 48.

A rear four bar linkage pivoting on the main pivot bracket 46 is formed by the rear rail assembly 30, balance link 38, main pivot arm 48 and a rear portion of the center rail 18. A drive motor comprising either an electric motor or a hydraulic cylinder drive (not shown) is operatively connected to the main pivot bracket 46 to cause the four bar linkage to move the top stack linkage. A forward four bar linkage is formed by a rear portion of the front rail 12, a front portion of the center rail 18, number one bow control link 24 and number two bow control link 22.

A pushing four bar linkage interconnects the front and rear four bar linkages. The pushing four bar linkage is so named because it "pushes" the forward four bar linkage as the convertible top retracts; in comparison to the conventional linkage, which "pulls" the forward four bar linkage as the convertible top retracts. Note, however, that the pushing four bar linkage "pulls" the forward linkage as the convertible top extends and the conventional linkage "pushes"as the convertible top extends.

The pushing four bar linkage is formed by the upper leg 34 of the rear rail assembly, the push link 26, a lower extension 50, and the center rail 18. This structure may also be called a crossing four bar linkage because the push link 26 and center rail 18 may cross over each other as illustrated in the figures. Therefore, the push link 26 may also be referred to as a crossing link.

Push link 26 interconnects the rear rail assembly 30 and the lower extension 50 of the number two bow control link 22. Movement of the rear four bar linkage is communicated by the pushing four bar linkage to the front four bar linkage. By connecting the push link 26 to the lower extension 50, the profile of the roof adjacent the #2 bow may be minimized. Further, the height of the balance link 38 is reduced as a result of the push link being connected to the lower extension 50. The balance link 38 attaches to a horn 52 on the center rail 18. In conventional top stacks, an upturned horn is provided at the rear part of the center rail to which the balance link and a "pull link" are attached. The "pull link" connects the horn to the front rail. This rear center rail horn is eliminated by the present invention's use of push link 26.

Figure 1:
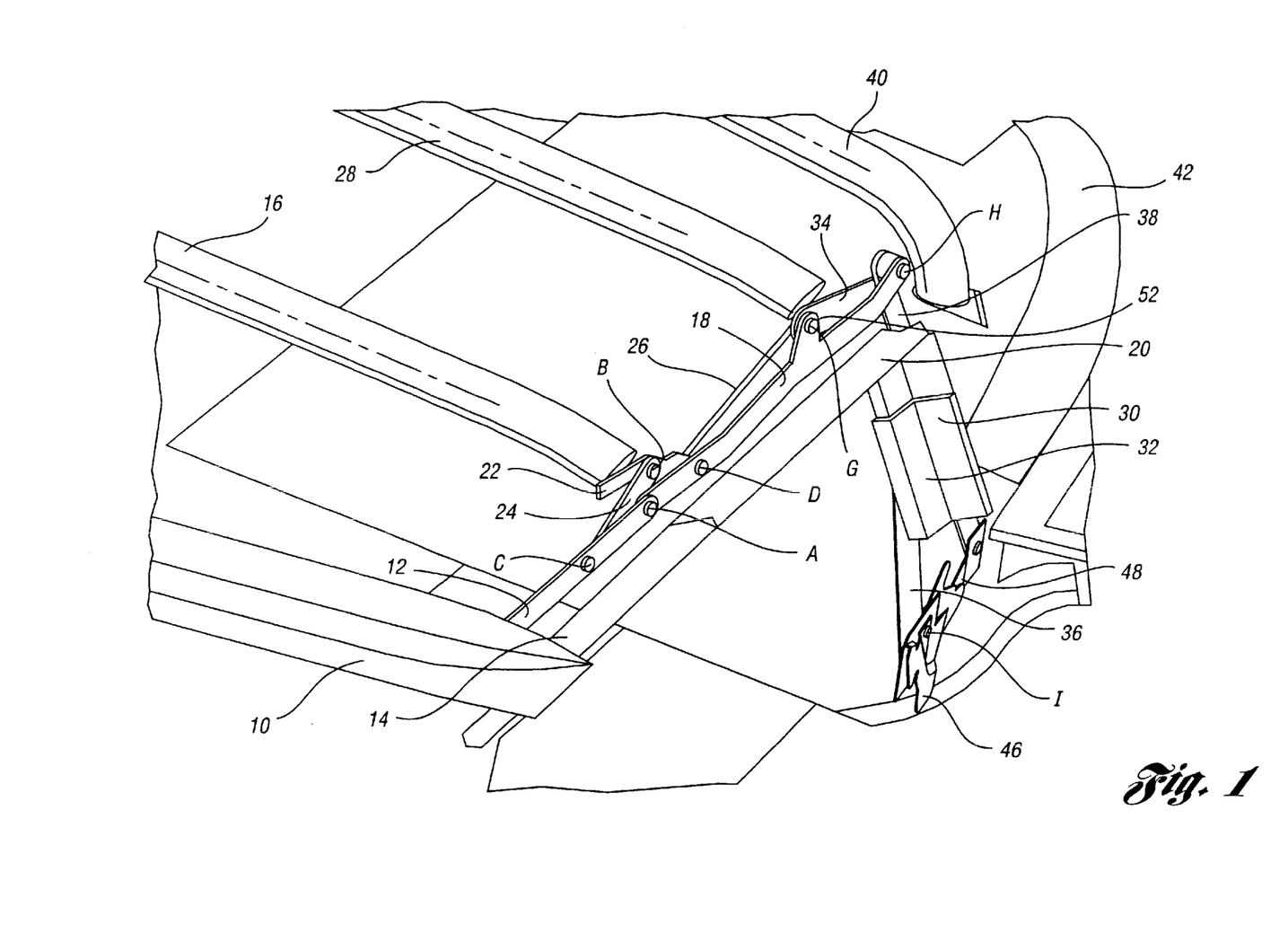
FIG. 1 is a fragmentary, left-side, front perspective view of the top stack linkage of the present invention in the full up position.
Figure 2:
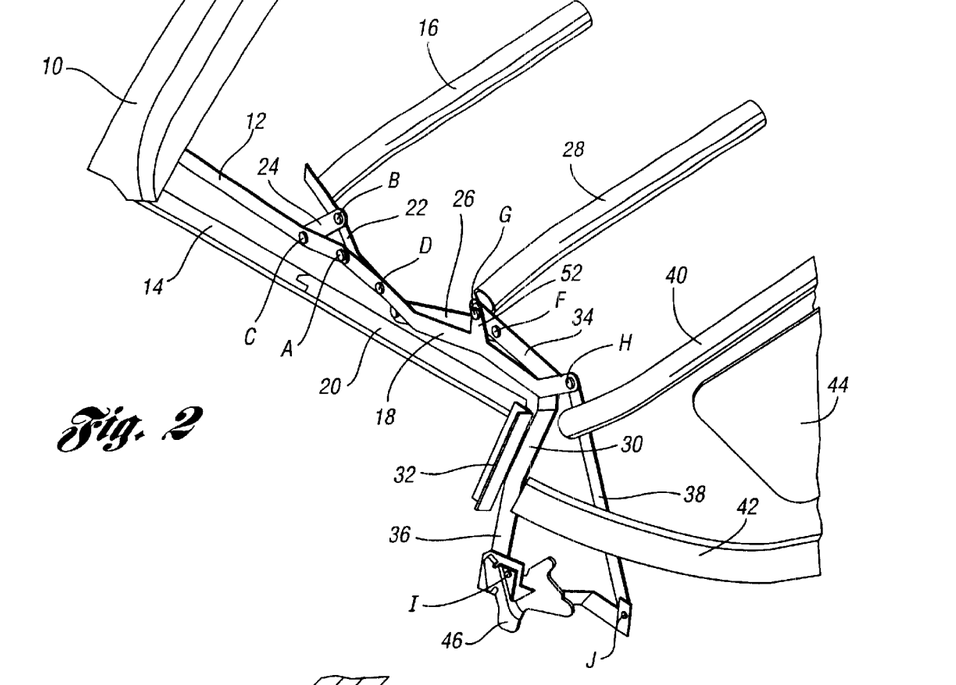
FIG. 2 is a fragmentary, left-side, rear perspective view of the top stack linkage of the present invention in the full up position.
Figure 3:
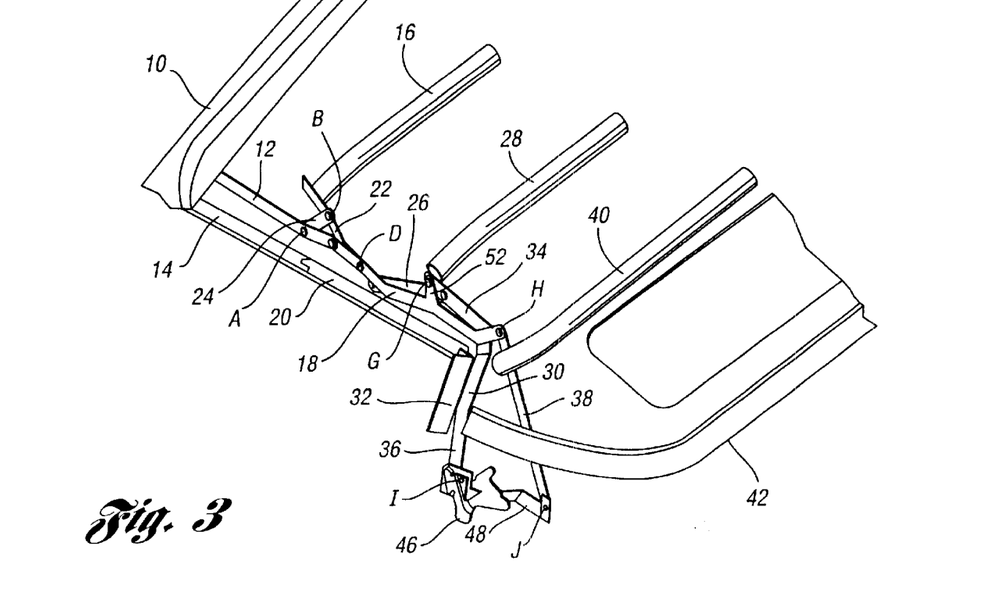
FIG. 3 is a fragmentary, left-side, rear perspective view of the top stack linkage of the present invention in the full up position.
Figure 4:
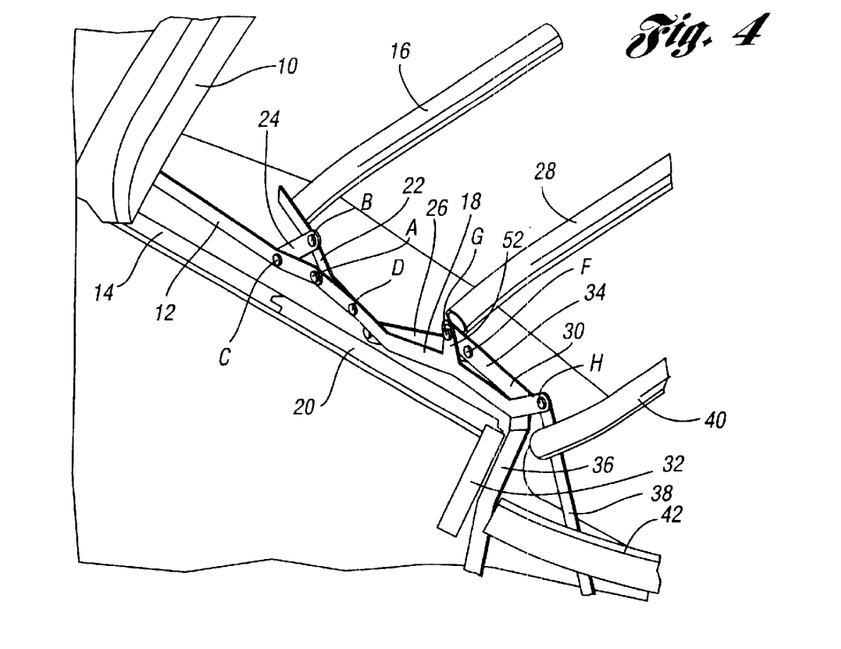
FIG. 4 is a fragmentary, left-side, rear perspective view of the top stack linkage of the present invention in the full up position.
Figure 5:
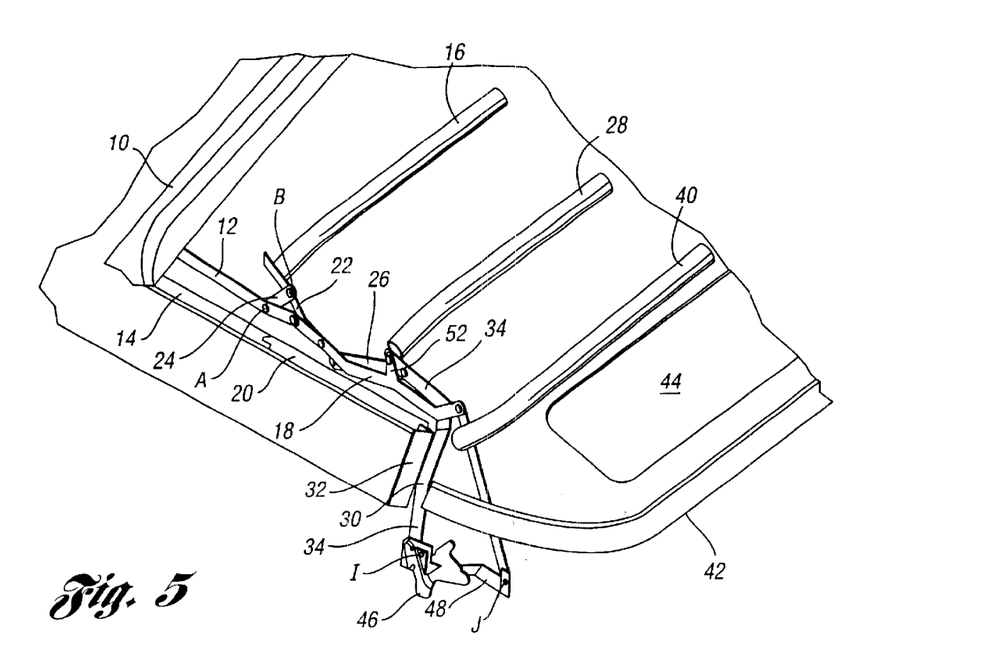
FIG. 5 is a left-side, rear perspective view of the top stack linkage of the present invention in the full up position.
Figure 6:
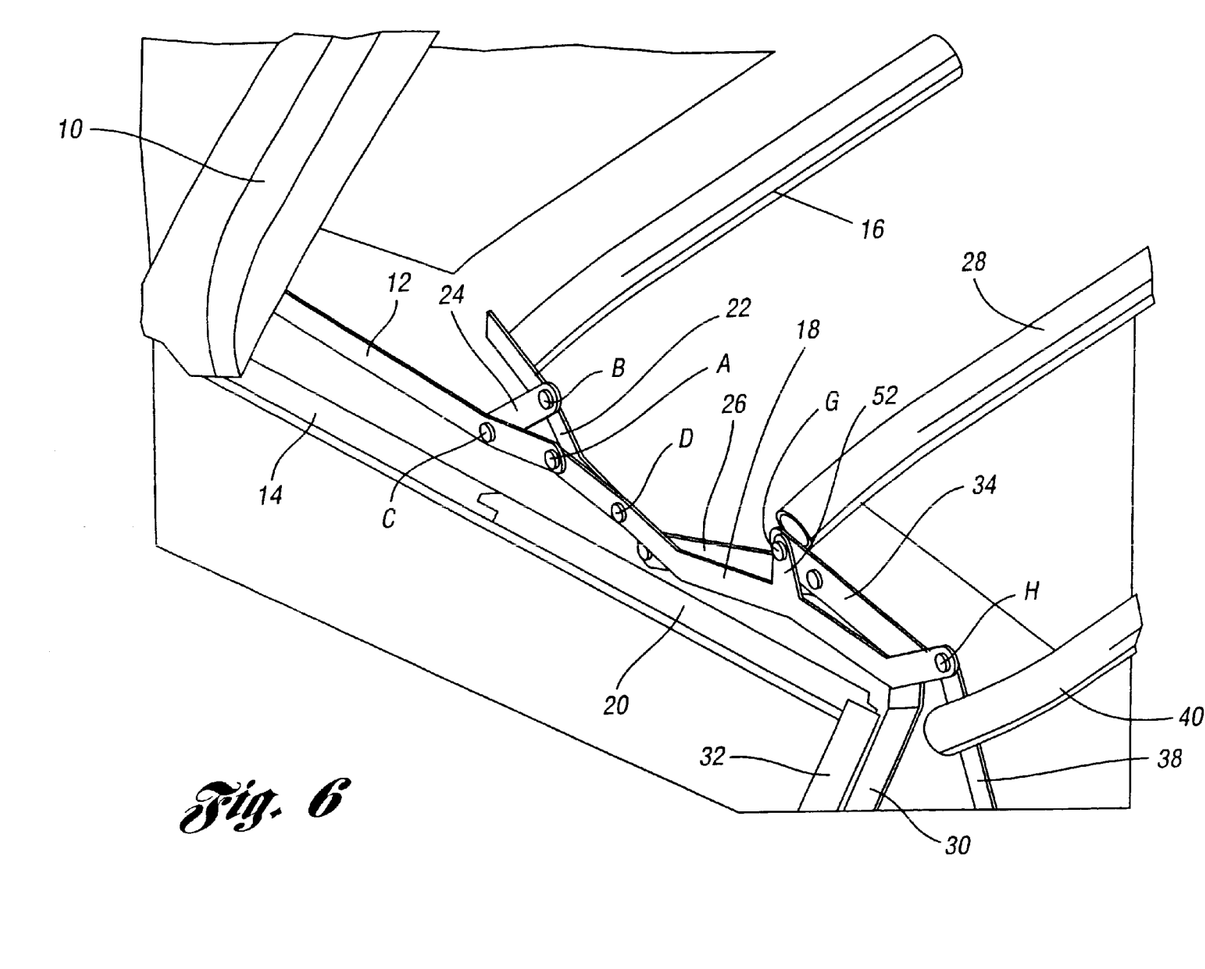
FIG. 6 is a fragmentary, left-side, front perspective view of the top stack linkage of the present invention in the full up position.
Figure 7:
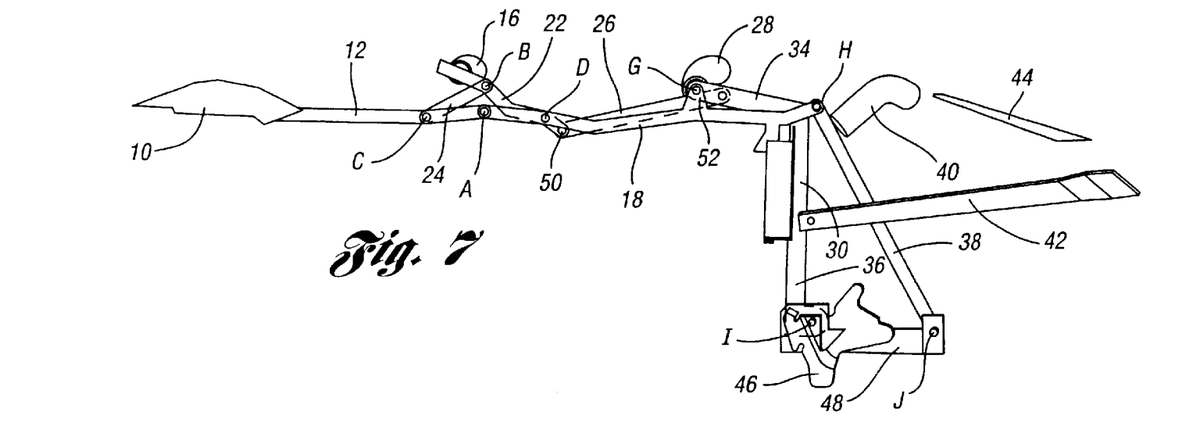
FIG. 7 is a left-side elevation view of the top stack linkage of the present invention in the full up position.
Figure 8:
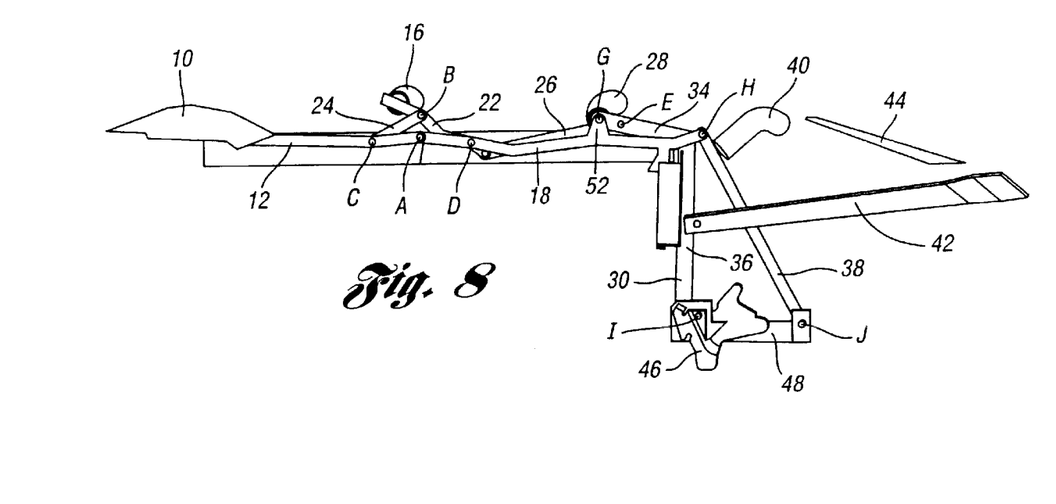
FIG. 8 is a left-side elevation view of the top stack linkage of the present invention in the full up position.
Figure 9:
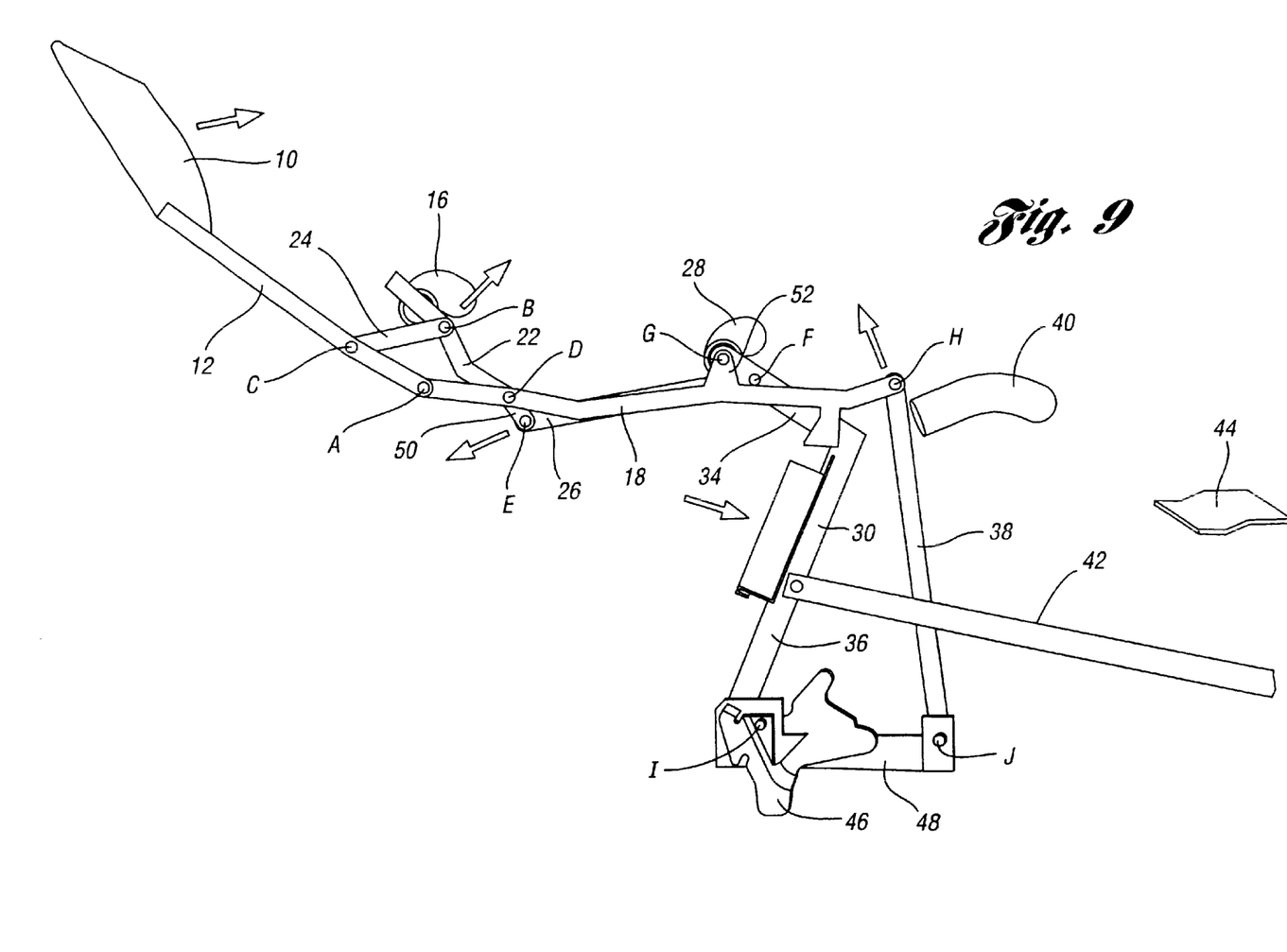
FIG. 9 is a left-side elevation view of the top stack linkage of the present invention as it begins retraction.

Referring now to FIGS. 7–12, the retraction cycle of the top stack linkage will be described as it is moved from its full up position through a series of steps in the cycle to the full down position. In FIG. 7, the top stack linkage is in its full up position. Force applied to the rear rail assembly by a hydraulic or an electric drive system causes the rear rail assembly 30 to rotate about pivot point I in a clockwise direction as shown in FIG. 9 that causes the center rail 18 to rotate in a counter-clockwise position about pivot point G. Push link 26 pushes on the lower extension 50 of the number two bow control link 22 causing it to rotate about pivot point D clockwise. The number two bow control link 22 causes the number one bow control link 24 to lift the front rail 12 and number one bow 10 moving them clockwise about pivot point A and lifting the number one bow 10 off of the windshield header. At the same time the center rail 18 moves the center pivot point A away from the scissor link upper pivot point B.

Figure 10:
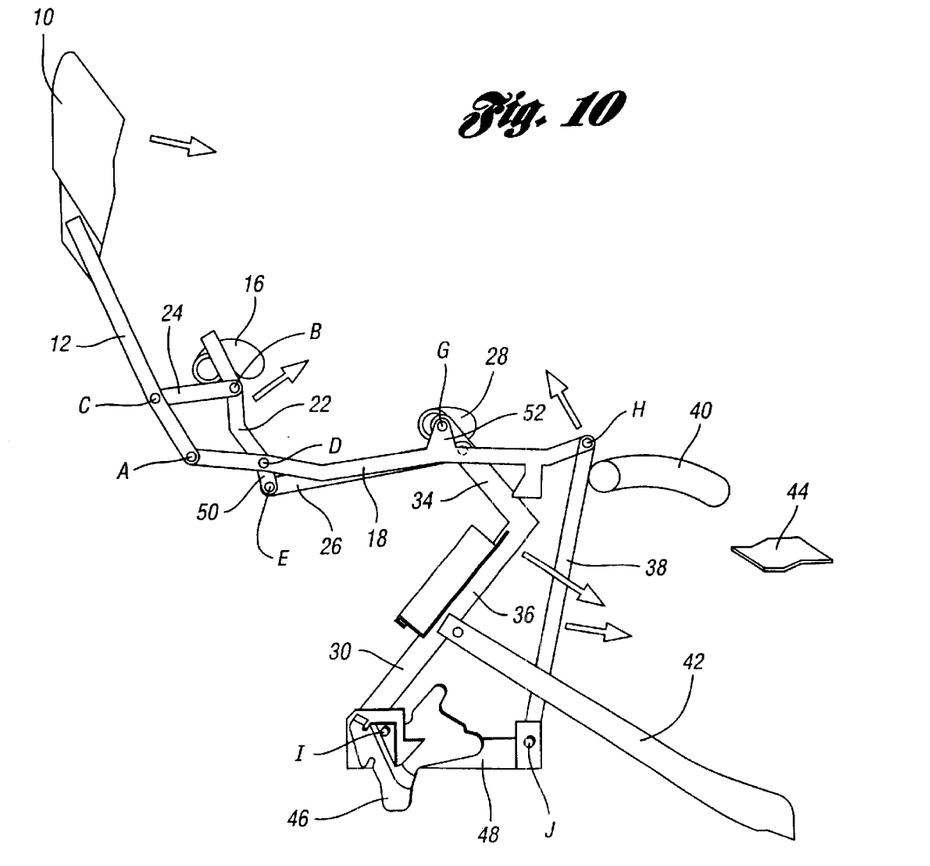
FIG. 10 is a left-side elevation view of the top stack linkage of the present invention in a mid-cycle position.

Referring now to FIG. 10, the movement of the top stack continues toward a mid cycle position wherein the rear rail assembly 30 and balance link 38 move in a clockwise direction about pivot points I and J, respectively, from an initially generally vertical orientation toward a horizontal orientation rearward of the main pivot bracket 46. The center rail 18 also moves rearwardly as the front rail 12 and number one bow 10 begin to fold back toward a position overlying the center rail 18.

Figure 11:
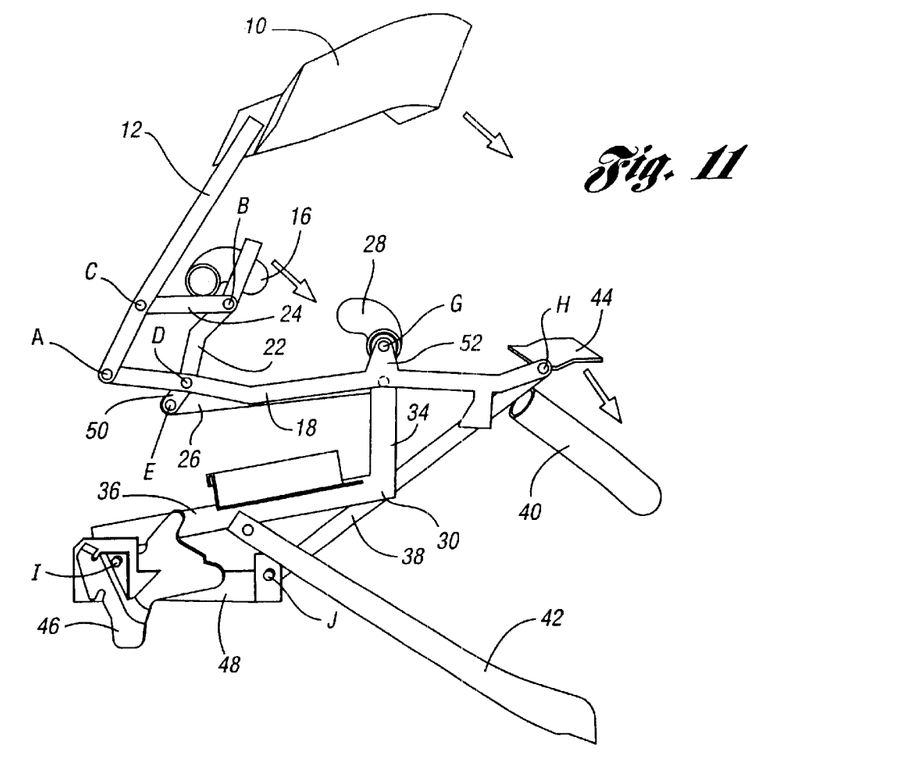
FIG. 11 is a left-side elevation view of the top stack linkage of the present invention late in the retraction cycle.

Referring now to FIG. 11, the rear rail assembly 30 is shown pivoted to a position wherein the main leg 36 is generally horizontal and the front leg 34 is generally vertical. The balance link 38 is inclined rearwardly. The center rail 18 is positioned generally above the rear rail assembly 30. The number one bow and front rail are inclined rearwardly. The push link 26 continues exerting a forwardly directed force on the lower extension 50 causing the front four bar link to generally rotate in a clockwise direction about the rear scissor link pivot point D.

Figure 12:
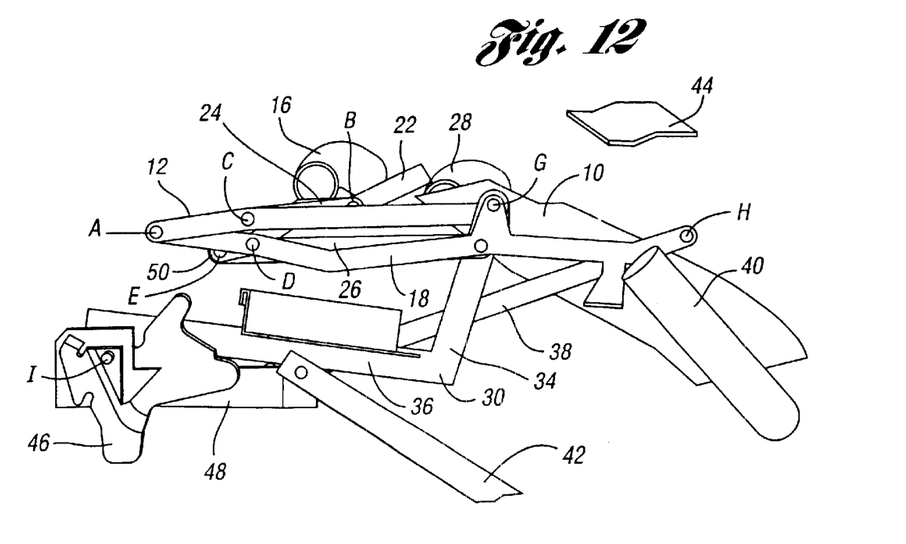
FIG. 12 is a side elevation view of the top stack linkage of the present invention in the full down position.

Referring now to FIG. 12, the top stack is shown in its full down position, or retracted position, wherein the number one bow 10 and front rail 12 are folded down against the center rail 18. The center rail 18 is folded back against the balance link 38 and main leg 36 of the rear rail assembly 30.

Figure 13:
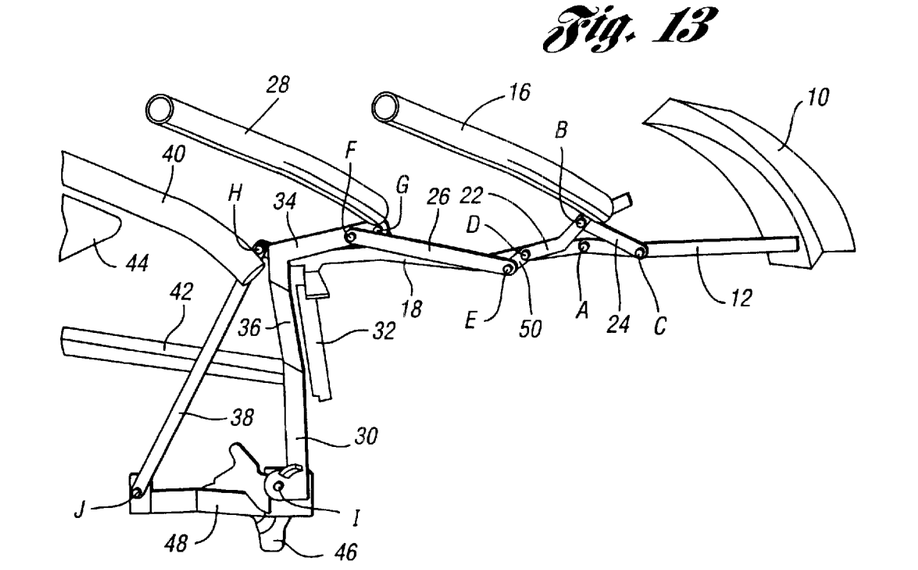
FIG. 13 is a bottom perspective view of the left-side of the top stack linkage of the present invention in the full up position.

Referring now to FIG. 13, the top stack linkage is shown in its full up position from the inside of the passenger compartment. The number one bow 10 and front rail 12 are connected to the number one bow control link 24 at front scissor link pivot point C and is connected to the center rail 18 at center pivot point A. The number one bow control link 24 is connected on its other end to an intermediate location on the #2 bow control link 22 at scissor link upper pivot point B. The #2 bow control link 22 is connected at scissor link upper pivot point B to the number one bow control link 24 and is connected to the center rail 18 at rear scissor link pivot point D. Front rail 12 and center rail 18 are connected at center pivot point A. Push link 26 is connected on its forward end to the lower extension 50 of the #2 bow control link and on its rear end to the rear rail assembly 30 at rear push link pivot point F. The rear rail assembly 30 is connected to the main pivot bracket 46 at main pivot point I. Center rail 18 is connected to the upper end of the balance link 38 at balance link upper pivot point H. Balance link 38 is connected on its lower end to the main pivot arm 48 at balance link lower pivot point J.

Figure 14:
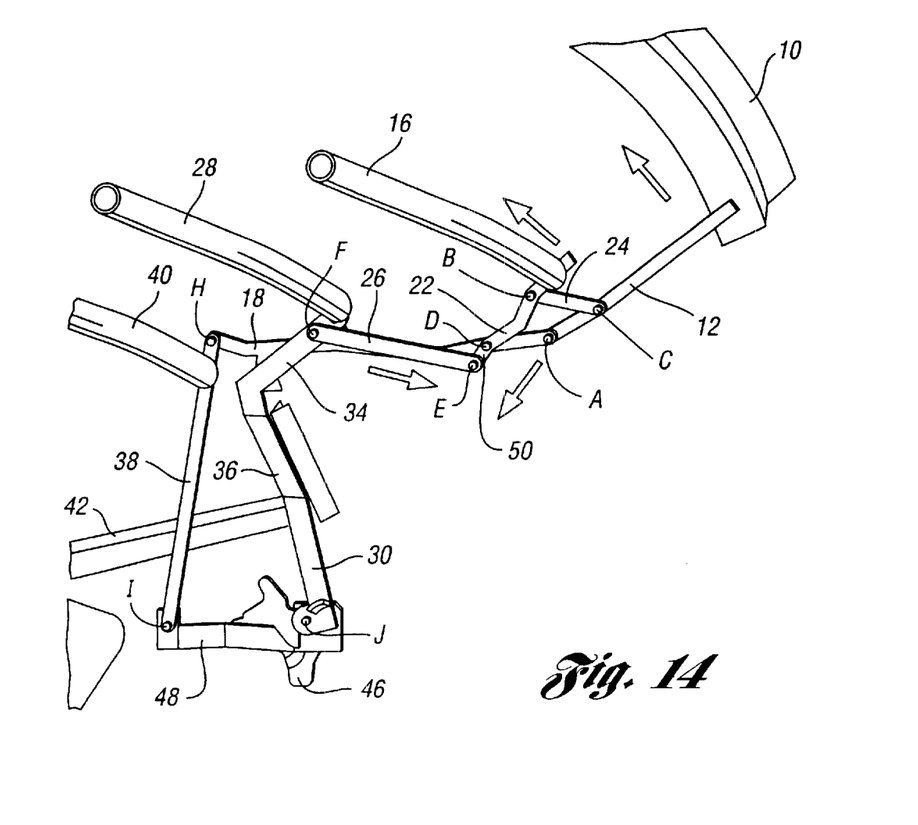
FIG. 14 is a bottom perspective view of the left-side of the top stack linkage of the present invention in an early cycle position.

Referring now to FIG. 14, the push link 26 is shown exerting a generally forwardly directed force on the lower extension 50 of the number two bow control link 22 causing the number two bow control link 22 to rotate in a counter-clockwise direction. This causes the number two bow control link 22 to rotate in a counter-clockwise direction and the front rail 12 to also rotate in a counter-clockwise direction while the other two links of the forward four bar link including the center rail 18 and number one bow control link 24 to rotate in a counter-clockwise direction.

Figure 15:
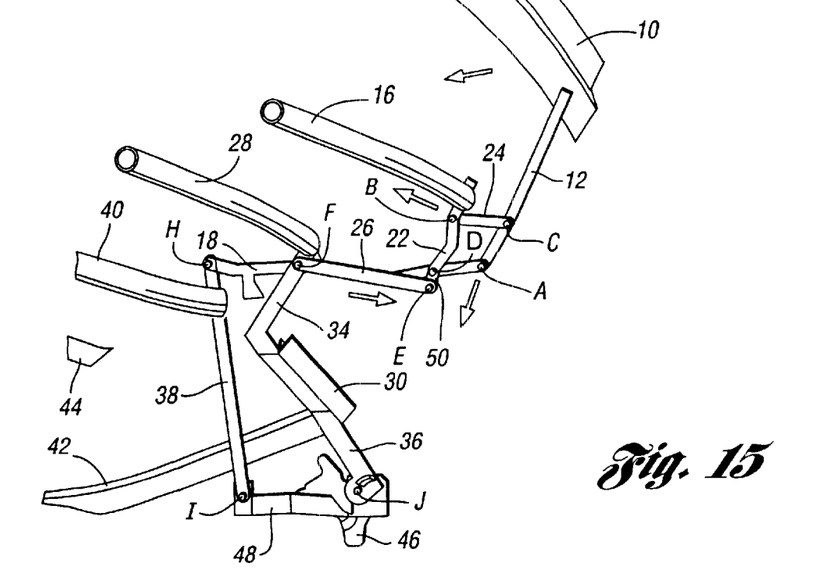
FIG. 15 is a bottom perspective view of the left-side of the top stack linkage of the present invention in a mid-cycle position.

Referring now to FIG. 15, the movements described in reference to FIG. 14 are continued to cause the number one bow 10 and front rail 12 to begin to fold rearwardly over the other components of the top stack.

Figure 16:
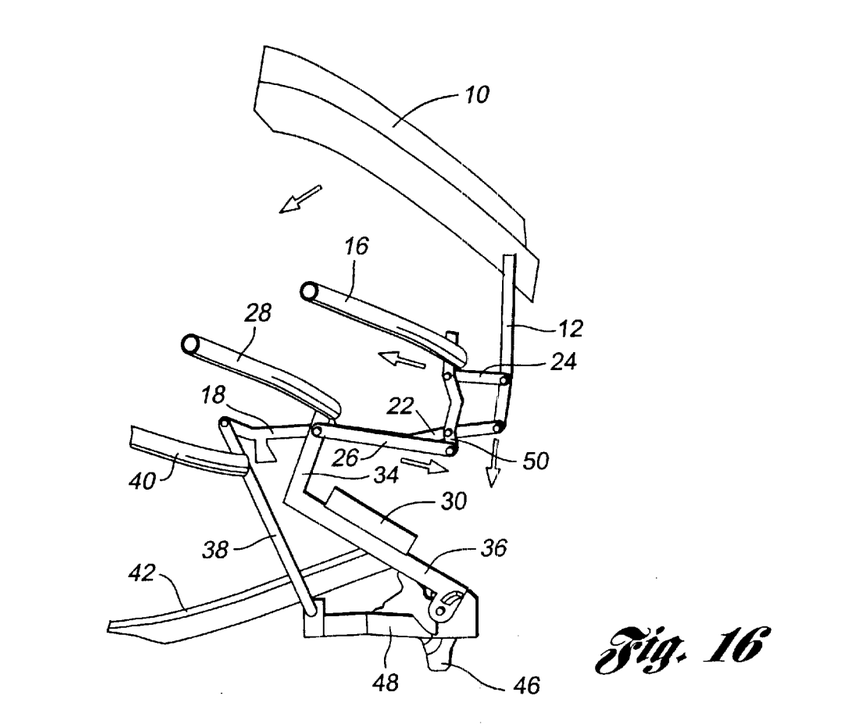
FIG. 16 is a bottom perspective view of the left-side of the top stack linkage of the present invention in a late cycle position.

Referring now to FIG. 16, the movements initiated in FIG. 14 and continued in FIG. 15 continue with the front rail 12 rotating over the center pivot point A as the push link 26 continues to drive the lower extension 50 forward causing the number two bow control link 22 to rotate in the counter-clockwise direction.

Figure 17:
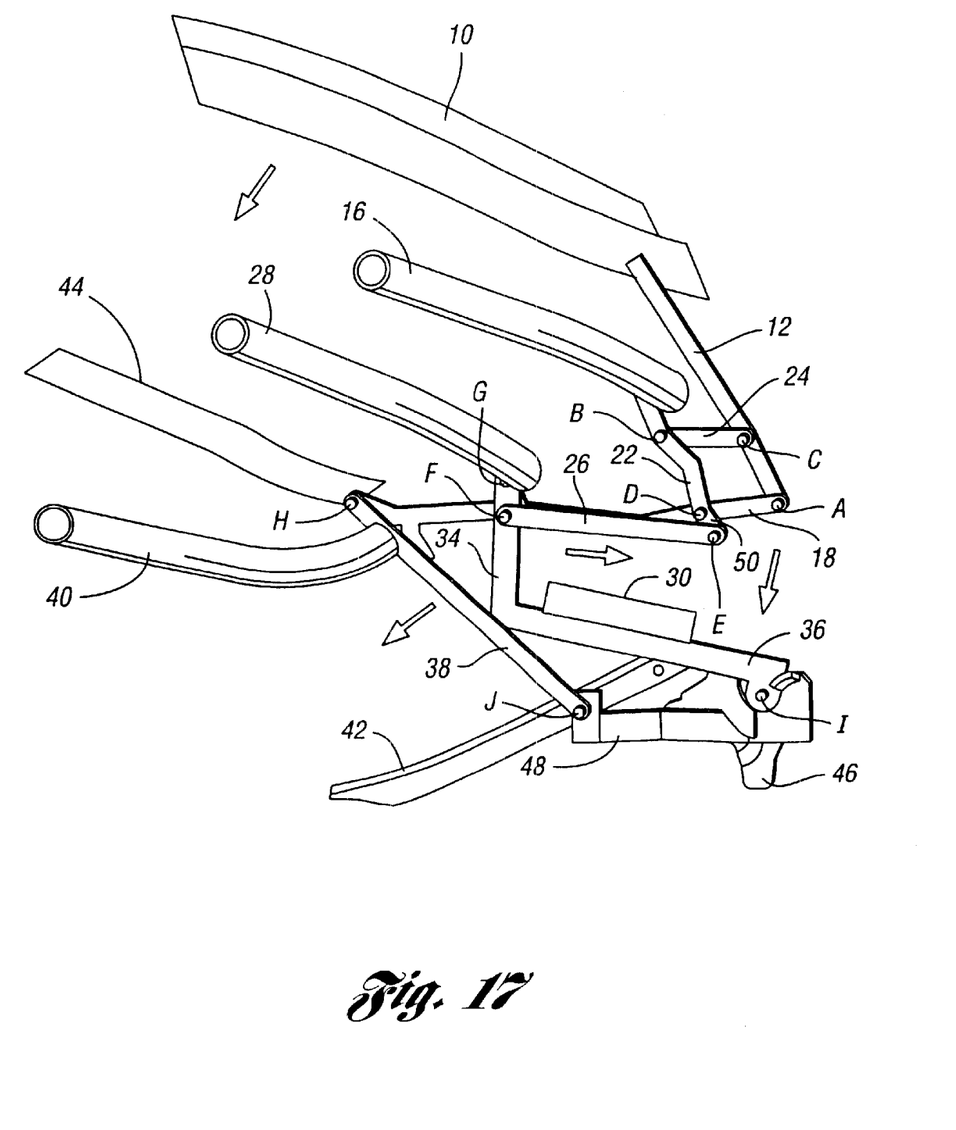
FIG. 17 is a bottom perspective view of the left-side of the top stack linkage of the present invention in a late cycle position just before reaching the fully retracted position.

Referring now to FIG. 17, the movement illustrated in reference to FIGS. 13–16 continues with the front rail 12 moving rearwardly and downwardly to fold over the other portions of the top stack. The center pivot point A is moved to a position wherein it is the forward most part of the top stack and is lowered against the rear rail assembly 30. The number two bow is folded rearwardly to a position just in front of the number three bow with the number one bow being folded to a position adjacent the balance link upper pivot point H on the center rail 18.

It should be understood that the invention has been described with reference to the left side portion of the top stack linkage and that there is a right side portion of the top stack linkage that is a mirror image of the left side and moves synchronously with the left side linkage.

It should also be noted that in the illustrations the position of the number five bow was not properly illustrated in all instances. For example, in FIG. 11, the number five bow should be shown extending generally horizontally so that it would rest above the wheel housing of the vehicle. The number five bow does not rotate to a vertical down position as shown in FIG. 12.

An alternative embodiment of the present invention may be developed wherein a number two bow control link could be reconfigured to extend to a position below the center pivot point A where it would be joined to the number one bow control link 24. This modification of the invention would permit additional reduction in the profile of the roof in the vicinity of the number two bow. The push link would act upon the number two bow control link as previously described and the general operation of the top stack linkage would be substantially the same.

The present invention has been described with reference to drawings showing a preferred embodiment of the invention and also includes references to modifications that are anticipated by Applicant. Other modifications may become apparent to one of ordinary skill in the art in view of the above description and attached drawings.

What is claimed is:

1. A convertible top and vehicle in combination comprising:
   a right linkage and a left linkage for extending and retracting the convertible top;
   a plurality of transverse bows, each connected to both the right and left linkages;
   a cover supported by the bows and the right and left linkages;
   each of the right and left linkages having:
      a rear four bar linkage and a forward four bar linkage, the rear linkage having a forward pivotal connection with a center rail and a rear pivotal connection with the center rail, the forward linkage having a forward pivotal connection with the center rail and a rear pivotal connection with the center rail, the forward linkage supporting a front rail, the rear linkage having a link that is fixed with respect to the vehicle;
      an upper pivotal axis coaxial with the forward pivotal connection of the center rail and the rear linkage;
      a crossing link for concurrent motion of the rear and forward linkages, the crossing link having a rear pivotal connection and a forward pivotal connection with the respective rear and forward linkages so that the front rail is inverted to a position adjacent the center rail, and the center rail is shifted to a position proximate the fixed link as the rear four bar linkage contracts; and
      a rear pivotal axis coaxial with the rear pivotal connection of the crossing link, the rear pivotal axis disposed such that it does not exceed the height of the upper pivotal axis.

2. The convertible top and vehicle in combination of claim 1, wherein the crossing link is in compression as the convertible top retracts and the crossing link is in tension as the convertible top extends.

3. The convertible top and vehicle in combination of claim 1, wherein the crossing link shifts forward with respect to the center rail as the convertible top is retracting, and the crossing link shifts rearward with respect to the center rail as the convertible top is extending.

4. The convertible top and vehicle in combination of claim 1, wherein the forward four bar linkage includes a second control link having a pivotal connection with the center rail and a pivotal connection with the crossing link, the second control link pivots about the center rail so that the pivotal connection with the crossing link pivots forward with respect to the center rail as the convertible top is retracting, and the pivotal connection with the crossing link pivots rearward with respect to the center rail as the convertible top is extending.

5. The convertible top and vehicle in combination of claim 4, wherein a crossing four bar linkage is defined by the crossing link, a portion of the second control link, a portion of the center rail, and a portion of one of the links connected to the center rail in the rearward linkage, the crossing four bar linkage generally being a parallelogram.

6. The convertible top and vehicle in combination of claim 1, wherein a portion of the vehicle defines the fixed link.

7. A convertible top and vehicle in combination comprising:
   a right linkage and a left linkage for extending and retracting the convertible top;
   a plurality of transverse bows, each connected to both the right and left linkages;
   a cover supported by the bows and the right and left linkages;
   each of the right and left linkages having:
      a rear four bar linkage having a link that is fixed with respect to the vehicle, a balance link pivotally connected to the fixed link and pivotally connected to a center rail, a rear rail pivotally connected to the fixed link and pivotally connected to the center rail, and an upper pivotal axis coaxial with the pivotal connection of the rear rail and the center rail;

a forward four bar linkage having a front rail pivotally connected to the center rail, a first control link pivotally connected to the first rail, and a second control link pivotally connected to the first control link and pivotally connected to the center rail;

a crossing link for concurrent motion of the rear and forward linkages, the crossing link having a rear pivotal connection with the rear rail, and a forward pivotal connection with an extension of the second control link, so that the front rail is inverted to a position adjacent the center rail, and the center rail is shifted to a position proximate the fixed link as the rear four bar linkage contracts; and a rear pivotal axis coaxial with the rear pivotal connection of the crossing link, the rear pivotal axis disposed such that it does not exceed the height of the upper pivotal axis.

8. The convertible top and vehicle in combination of claim 7, wherein the crossing link is in compression as the convertible top retracts and the crossing link is in tension as the convertible top extends.

9. The convertible top and vehicle in combination of claim 7, wherein the crossing link shifts forward with respect to the center rail as the convertible top is retracting, and the crossing link shifts rearward with respect to the center rail as the convertible top is extending.

10. The convertible top and vehicle in combination of claim 7, wherein the second control link pivots about the center rail so that the pivotal connection with the crossing link pivots forward with respect to the center rail as the convertible top is retracting, and the pivotal connection with the crossing link pivots rearward with respect to the center rail as the convertible top is extending.

11. The convertible top and vehicle in combination of claim 7, wherein a crossing four bar linkage is defined by the crossing link, a portion of the second control link, a portion of the center rail, and a portion of the rear rail, the crossing four bar linkage generally being a parallelogram.

12. The convertible top and vehicle in combination of claim 7, wherein a portion of the vehicle defines the fixed link.

13. A convertible top and vehicle in combination comprising:

a right linkage and a left linkage for extending and retracting the convertible top;

a plurality of transverse bows, each connected to both the right and left linkages;

a cover supported by the bows and the right and left linkages;

each of the right and left linkages having:

a rear four bar linkage and a forward four bar linkage, the rear linkage having a forward pivotal connection with a center rail and a rear pivotal connection with the center rail, the forward linkage having a forward pivotal connection with the center rail and a rear pivotal connection with the center rail, the forward linkage supporting a front rail, the rear linkage having a link that is fixed with respect to the vehicle;

an upper pivotal axis coaxial with the forward pivotal connection of the center rail and the rear linkage;

a push link for concurrent motion of the rear and forward linkages, the push link having a rear pivotal connection and a forward pivotal connection with the respective rear and forward linkages whereby the center rail is shifted to a position proximate the fixed link, and the push link pushes the forward linkage so that the front rail inverts to a position adjacent the center rail as the rear four bar linkage contracts; and a rear pivotal axis coaxial with the rear pivotal connection of the crossing link, the rear pivotal axis disposed such that it does not exceed the height of the upper pivotal axis.

14. The convertible top and vehicle in combination of claim 13, wherein the push link is in compression as the convertible top retracts and the push link is in tension as the convertible top extends.

15. The convertible top and vehicle in combination of claim 13, wherein the push link shifts forward with respect to the center rail as the convertible top is retracting, and the push link shifts rearward with respect to the center rail as the convertible top is extending.

16. The convertible top and vehicle in combination of claim 13, wherein the forward four bar linkage includes a second control link having a pivotal connection with the center rail and a pivotal connection with the push link, the second control link pivots about the center rail so that the pivotal connection with the push link pivots forward with respect to the center rail as the convertible top is retracting, and the pivotal connection with the push link pivots rearward with respect to the center rail as the convertible top is extending.

17. The convertible top and vehicle in combination of claim 16, wherein a pushing four bar linkage is defined by the push link, a portion of the second control link, a portion of the center rail, and a portion of one of the links connected to the center rail in the rearward linkage, the crossing four bar linkage generally being a parallelogram.

18. The convertible top and vehicle in combination of claim 13, wherein a portion of the vehicle defines the fixed link.

19. A convertible top and vehicle in combination comprising:

a right linkage and a left linkage for extending and retracting the convertible top;

a plurality of transverse bows, each connected to both the right and left linkages;

a cover supported by the bows and the right and left linkages;

each of the right and left linkages having:

a rear four bar linkage having a link that is fixed with respect to the vehicle, a balance link pivotally connected to the fixed link and pivotally connected to a center rail, a rear rail pivotally connected to the fixed link and pivotally connected to the center rail, and an upper pivotal axis coaxial with the pivotal connection of the rear rail and the center rail;

a forward four bar linkage having a front rail pivotally connected to the center rail, a first control link pivotally connected to the first rail, and a second control link pivotally connected to the first control link and pivotally connected to the center rail;

a push link for concurrent motion of the rear and forward linkages, the push link having a rear pivotal connection with the rear rail, and a forward pivotal connection with an extension of the second control link, whereby the center rail is shifted to a position proximate the fixed link, and the push link pushes the forward linkage so that the front rail inverts to a position adjacent the center rail as the rear four bar linkage contracts; and a rear pivotal axis coaxial with the rear pivotal connection of the crossing link, the rear pivotal axis disposed such that it does not exceed the height of the upper pivotal axis.

20. The convertible top and vehicle in combination of claim 19, wherein the push link is in compression as the convertible top retracts and the push link is in tension as the convertible top extends.

21. The convertible top and vehicle in combination of claim 19, wherein the push link shifts forward with respect to the center rail as the convertible top is retracting, and the push link shifts rearward with respect to the center rail as the convertible top is extending.

22. The convertible top and vehicle in combination of claim 19, wherein the second control link pivots about the center rail so that the pivotal connection with the push link pivots forward with respect to the center rail as the convertible top is retracting, and the pivotal connection with the push link pivots rearward with respect to the center rail as the convertible top is extending.

23. The convertible top and vehicle in combination of claim 19, wherein a pushing four bar linkage is defined by the push link, a portion of the second control link, a portion of the center rail, and a portion of the rear rail, the crossing four bar linkage generally being a parallelogram.

24. The convertible top and vehicle in combination of claim 19, wherein a portion of the vehicle defines the fixed link.

* * * * *